United States Patent
Edwards et al.

(10) Patent No.: US 12,282,922 B2
(45) Date of Patent: *Apr. 22, 2025

(54) AUTHENTICATING BASED ON BEHAVIORAL TRANSACTIONAL PATTERNS

(71) Applicant: Capital One Services, LLC, McLean, VA (US)

(72) Inventors: Joshua Edwards, Philadelphia, PA (US); David Septimus, New York, NY (US); Samuel Rapowitz, Roswell, GA (US); Jenny Melendez, Falls Church, VA (US); Tyler Maiman, Melville, NY (US); Viraj Chaudhary, Katy, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,394

(22) Filed: Jan. 2, 2024

(65) Prior Publication Data

US 2024/0135379 A1     Apr. 25, 2024

Related U.S. Application Data

(63) Continuation of application No. 17/365,642, filed on Jul. 1, 2021, now Pat. No. 11,900,377.

(51) Int. Cl.
*G06Q 20/40*        (2012.01)
*G06F 18/23213*        (2023.01)
(Continued)

(52) U.S. Cl.
CPC ... *G06Q 20/4014* (2013.01); *G06F 18/23213* (2023.01); *G06N 20/00* (2019.01); *G06Q 20/3224* (2013.01)

(58) Field of Classification Search
CPC .......... G06Q 20/4014; G06Q 20/3224; G06Q 20/382; G06Q 20/40; G06Q 20/405; G06Q 20/12; G06F 18/23213; G06N 20/00

See application file for complete search history.

(56) References Cited

U.S. PATENT DOCUMENTS 9,202,173 B1 * 12/2015 Dotan ...................... G06N 5/04
9,514,407 B1 * 12/2016 Dotan .................... G06N 5/022
(Continued)

FOREIGN PATENT DOCUMENTS

WO    WO-2018107128 A1 * 6/2018 ............. G06N 20/00

OTHER PUBLICATIONS

Sulayman et al.; "Human Trait Analysis via Machine Learning Techniques for User Authentication", 2020, Crown. pp. 1-10. (Year: 2020).*

(Continued)

*Primary Examiner* — Matthew Smithers
(74) *Attorney, Agent, or Firm* — Banner & Witcoff, Ltd.

(57) ABSTRACT

Aspects described herein may allow for authenticating a user by generating a customized set of authentication questions based on patterns that are automatically detected and extracted from user data. The user data may include transaction data collected over a period of time. By automatically detecting user patterns that correspond to user behavior over a period of time, an authentication system may be able to generate information that is recognizable to an authentic user but difficult to guess or circumvent for any other user.

20 Claims, 4 Drawing Sheets

(51) Int. Cl.
*G06N 20/00* (2019.01)
*G06Q 20/32* (2012.01)

(56) References Cited

U.S. PATENT DOCUMENTS

| | | | | |
|---|---|---|---|---|
| 9,565,562 | B1* | 2/2017 | Bar-Menachem | ........................... H04W 12/065 |
| 10,255,558 | B1* | 4/2019 | Kronrod | ................. G06F 21/45 |
| 11,392,481 | B1* | 7/2022 | Yamane | ................... G06N 5/04 |
| 11,423,131 | B2* | 8/2022 | Nygate | ............... G06F 16/2455 |
| 11,455,641 | B1* | 9/2022 | Shahidzadeh | ......... H04L 67/306 |
| 2009/0106134 | A1* | 4/2009 | Royyuru | ................ G06Q 40/00 705/35 |
| 2012/0310702 | A1* | 12/2012 | Paulsen | ................... H04L 67/02 705/7.29 |
| 2015/0032522 | A1* | 1/2015 | Dintenfass | ......... G06Q 30/0226 705/14.27 |
| 2015/0142593 | A1* | 5/2015 | Chauhan | .............. G06Q 20/047 705/21 |
| 2015/0220926 | A1* | 8/2015 | McLachlan | ........ G06Q 20/4014 705/44 |
| 2015/0220999 | A1* | 8/2015 | Thornton | ............ H04M 15/805 705/14.66 |
| 2018/0219846 | A1* | 8/2018 | Poschel | ................ H04L 63/0807 |
| 2019/0340613 | A1* | 11/2019 | Ghosh | .................... H04L 9/3271 |
| 2020/0193443 | A1* | 6/2020 | Piel | ........................ G06N 20/00 |
| 2020/0357051 | A1* | 11/2020 | Hunt | ........................ G06Q 20/20 |
| 2021/0109956 | A1* | 4/2021 | Su | ........................... G06N 5/025 |
| 2021/0173916 | A1* | 6/2021 | Ortiz | .................... G06V 10/764 |
| 2021/0191926 | A1 | 6/2021 | Izenson et al. | |
| 2021/0264437 | A1* | 8/2021 | Flowers | ............. G06Q 20/4016 |
| 2022/0164699 | A1* | 5/2022 | Neupane | ................ G06Q 20/405 |
| 2022/0391905 | A1* | 12/2022 | Edwards | ................ G06Q 20/40 |

OTHER PUBLICATIONS

Oct. 21, 2022—(WO) International Search Report and Written Opinion—App No. PCT/US2022/035743.

Sulayman et al. "Human Trait Analysis via Machine Learning Techniques for User Authentication" Crown, 2020, pp. 1-10.

* cited by examiner

200

| Tx Date | Tx Day | Tx Time | Weekday? | Merchant | Merchant Type | Amount |
|---|---|---|---|---|---|---|
| 3-11-21 | Th | 9:32 AM | 1 | Café Viraj | Coffee | $3.15 |
| 3-10-21 | We | 9:15 AM | 1 | Café Viraj | Coffee | $3.15 |
| 3-10-21 | We | 6:01 PM | 1 | DaveMart | Grocery | $63.72 |
| 3-8-21 | Mo | 12:25 PM | 1 | Sam's Subs | Lunch | $12.58 |
| 3-5-21 | Fr | 7:22 PM | 1 | Jenny's Diner | Restaurant | $101.22 |
| 3-4-21 | Th | 6:32 PM | 1 | DaveMart | Grocery | $54.33 |
| 2-28-21 | Su | 8 AM | 0 | Maiman Club | Gym | $1.25 |
| 2-27-21 | Sa | 9:43 AM | 0 | Maiman Club | Gym | $1.25 |
| 2-26-21 | Fr | 8:05 PM | 1 | Chez Edwards | Restaurant | $225.00 |
| 2-26-21 | Fri | 9:07 AM | 1 | Café Viraj | Coffee | $3.15 | ated, generate, based on the one or more machine learning outputs, a spending pattern associated with the user. The method may comprise generating, based on the spending pattern, a question to authenticate the user and a correct answer to the question, and generating, based on the correct answer, one or more incorrect answers to the question. The computing device may then receive, from the user device, a response to the authentication question, and provide, to the user device and based on the response to the authentication question, access to the account.

AUTHENTICATING BASED ON BEHAVIORAL TRANSACTIONAL PATTERNS

CROSS-REFERENCE TO RELATED APPLICATIONS

This application is a continuation of U.S. patent application Ser. No. 17/365,642, filed Jul. 1, 2021, titled "Authenticating Based on Behavioral Transaction Patterns,"

FIELD OF USE

Aspects of the disclosure relate generally to authentication of users and more specifically to systems that generate questions for authenticating user access to a user account.

BACKGROUND

Providing secure access to private user accounts and data is a constant problem. Malicious attackers frequently attempt to gain access to user accounts. Account providers need to be able to distinguish authentic users from malicious attackers. Account providers often attempt to authenticate a user by asking the user something that the account owner or other authentic user would know and that a malicious attacker would not. A common solution is a username and password, but this solution is not always sufficient, and cannot be used in every situation. Many solutions can make authentication too difficult for an authentic user or too easy to circumvent by a malicious attacker. There is a need for additional methods of distinguishing between authentic users, who should be granted access without excessive difficulty, and any other user, who should be denied access.

Aspects described herein may address these and other problems, and generally improve the quality, efficiency, and speed of user authentication methods.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein may allow for authenticating a user by generating a customized set of authentication questions based on patterns that are automatically detected and extracted from user data. The user data may include transaction data collected over a period of time. By automatically detecting user patterns that correspond to user behavior over a period of time, an authentication system may be able to generate information that is recognizable to an authentic user but difficult to guess or circumvent for any other user.

More particularly, some aspects described herein may provide a computer-implemented method for receiving, from a user device, a request for access to an account associated with a user. The method may comprise retrieving transaction data for the account, wherein the transaction data indicates a plurality of transactions. A computing device may then generate, based on the transaction data, for each transaction of the plurality of transactions, machine learning inputs, provide the machine learning inputs to a machine learning algorithm to yield one or more machine learning outputs, and generate, based on the one or more machine learning outputs, a spending pattern associated with the user. The method may comprise generating, based on the spending pattern, a question to authenticate the user and a correct answer to the question, and generating, based on the correct answer, one or more incorrect answers to the question. The computing device may then receive, from the user device, a response to the authentication question, and provide, to the user device and based on the response to the authentication question, access to the account.

In some embodiments, the generating of the machine learning inputs may comprise generating, for each transaction of the plurality of transactions, machine learning inputs comprising one or more of a time of the transaction, a location of the transaction, a day of the transaction, a merchant associated with the transaction, or a type of the merchant associated with the transaction. The machine learning algorithm may be a clustering algorithm, the one or more machine learning outputs may be clusters of transactions, and the spending pattern may indicate at least one typical user behavior corresponding to at least one of the one or more clusters of transactions.

Additionally and/or alternatively, the spending pattern may indicate one or more of a time period during which a user typically transacts with a particular merchant, a time period during which a user typically transacts with a particular type of merchant, a time period during which a user typically does not transact with any merchant, or a time period during which a user typically begins or ends an activity.

In some embodiments, the question may indicate a merchant or a type of merchant, and the correct answer may indicate a first time period during which the user typically transacts with the merchant or the type of merchant. The incorrect answers may indicate other time periods that do not overlap with the first time period.

Additionally and/or alternatively, the question may indicate a time period, and the correct answer may indicate a first merchant that the user typically transacts with during the time period. The incorrect answers may indicate other merchants of the same type as the first merchant.

In some embodiments, the method further comprises generating, for the user, a fake spending pattern that does not overlap with the spending pattern for the user. The method may then comprise generating a second question and one or more incorrect answers to the second question based on the fake spending pattern, and generating a correct answer to the second question, wherein the providing of access to the account is further based on a user response to the second question.

Additionally and/or alternatively, the method further comprises measuring a deviation of the spending pattern from a spending pattern for an average user, wherein the generating of the question is based on the deviation.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
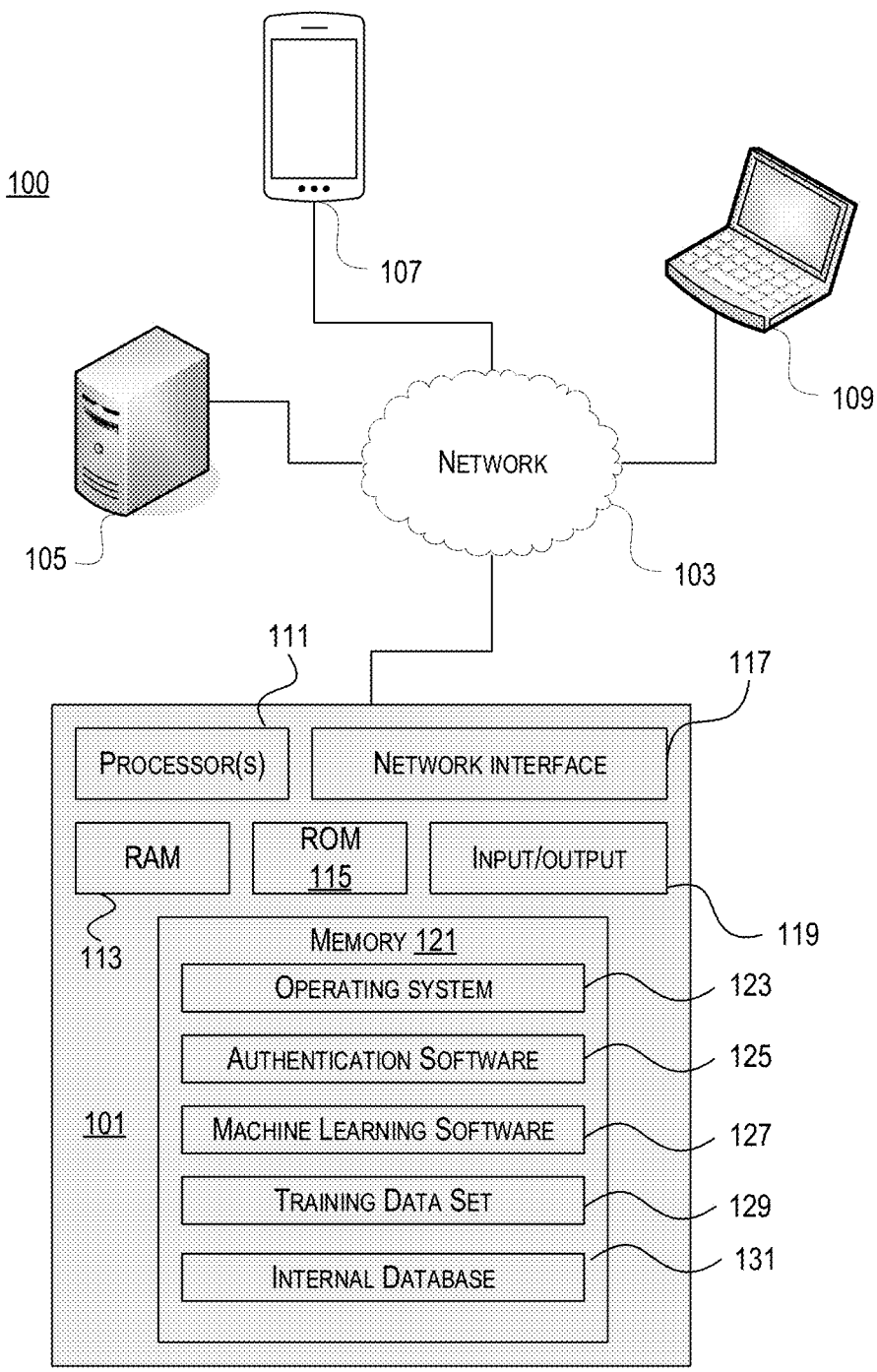
FIG. 1 shows an example of a authentication system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for authenticating user access to user accounts. Account providers (e.g., financial institutions) commonly authenticate users using several methods, which may be easy to use but may suffer technological drawbacks. For example, account providers may ask users to provide answers to a few security questions (e.g., what city did you grow up in?). However, these types of questions may be easily guessable for malicious users that have basic information about an authentic user, and/or may be vulnerable to keylogging and other strategies because the same questions tend to be reused over and over. Another approach is displaying data about a recent transaction and asking the user whether they recognize it. However, this approach may be difficult for authentic users, who may not remember a particular transaction of the many transactions they make in a day, week, or month. Additionally, this approach may be vulnerable to circumvention by anyone who obtains basic information about one or more recent user purchases, for example by obtaining a recent user bill (e.g., in the mail or the trash) or tracking the behavior of the authentic user for a short amount of time (e.g., via in-person, online, or some other tracking method), etc.

Among other features, the methods and systems described below improve on this situation by providing an authentication method that does not rely on recycled authentication questions, and is not easily vulnerable to circumvention by malicious users that have a small amount of data about a user. By analyzing a potentially large volume of user transactions to automatically detect user spending patterns and other user patterns, and generate questions about the patterns that only an authentic user would likely know, an authentication server may provide a secure and robust authentication method.

An authentication server implementing the techniques described herein thus will be able to provide a secure authentication method that has several technological benefits. First, the generation of authentication information based on large data sets reduces the likelihood of circumvention by malicious users who are able to capture some data about an authentic user. Without obtaining a very large amount of data about an authentic user, a malicious user is unlikely to be able to correctly answer several questions generated based on different patterns that are observed from a large data set.

Second, the use of automated machine learning techniques to automatically identify clusters or other patterns from multi-dimensional data enables the generation of authentication information that may be completely impractical or even impossible for a human to generate. Users commonly make several transactions a day, and user transactions histories may include months or years of data. Each transaction may be associated with a large number of data fields characterizing a particular transaction, a time of the transaction, a type of the transaction, a merchant involved in the transaction, information about the merchant involved in the transaction, an amount spent in the transaction, an item purchased in the transaction, etc. It may be impractical or impossible for a human to analyze such detailed data in large quantities and recognize multi-dimensional patterns that may be used for authentication purposes. Thus, even if a malicious user did have a large volume of information about an authentic user, the malicious user may be unable to use the data to correctly respond to authentication questions generated by the authentication server.

Finally, by automatically analyzing the transaction data using machine learning methods, detecting patterns from the machine learning outputs, and generating questions from the spending patterns, and by automatically providing the questions to a user, the authentication server may provide a robust authentication process that does not require a customer service operator or some other human at all. Thus, social engineering and other types of confidence techniques may be unavailable to a malicious user seeking to gain access to an account.

FIG. 1 shows a system 100. The system 100 may include a plurality of devices including an authentication system 101, a plurality of user devices (e.g., mobile device 107, computing device 109), and/or account data server 105 in communication via a network 103. It will be appreciated that the network connections shown are illustrative and any means of establishing a communications link between the devices may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

User devices (e.g., mobile device 107, computing device 109) may send authentication requests to the authentication system 101 in order to obtain access to a user account as described herein. The account data server 105 may include databases of account information that may be accessed by the authentication system 101 as described herein. Databases may include, but are not limited to relational databases, hierarchical databases, distributed databases, in-memory databases, flat file databases, XML databases, NoSQL databases, graph databases, and/or a combination thereof. The authentication system 101 may receive authentication requests, obtain account information for accounts, generate customized authentication questions in order to verify users' identities, and authorize access to the accounts as described herein. The network 103 may include a local area network (LAN), a wide area network (WAN), a wireless telecommunications network, and/or any other communication network or combination thereof.

The data transferred to and from various computing devices in a system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

The authentication system 101 may be used to implement one or more of the techniques described herein. The authentication system 101 may include one or more processor(s) 111 for controlling overall operation of the authentication system 101 and its associated components, including RAM 113, ROM 115, input/output device 119, network interface 117, and/or memory 121. A data bus may interconnect processor(s) 111, RAM 113, ROM 115, memory 121, I/O device 119, and/or network interface 117. In some embodiments, the authentication system 101 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Software may be stored within memory 121 to provide instructions to processor(s) 111 to allow the search system 101 to perform various actions. For example, memory 121 may store software used by the search system 101, such as an operating system 123, software such as authentication software 125 and/or a machine learning software 127, and an associated internal database 131. The various hardware memory units in memory 121 may include volatile and nonvolatile, removable and non-removable media implemented in any method or technology for storage of information such as computer-readable instructions, data structures, program modules, or other data. Memory 121 may include one or more physical persistent memory devices and/or one or more non-persistent memory devices. Memory 121 may include, but is not limited to, random access memory (RAM) 113, read only memory (ROM) 114, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor(s) 111.

Network interface 117 may include one or more transceivers, digital signal processors, and/or additional circuitry and software for communicating via any network, wired or wireless, using any protocol as described herein.

The processor(s) 111 may include a single central processing unit (CPU), which may be a single-core or multi-core processor, or may include multiple CPUs. The processor(s) 111 and associated components may allow the authentication system 101 to execute a series of computer-readable instructions to perform some or all of the processes described herein. Although not shown in FIG. 1, various elements within memory 121 or other components in search system 101 may include one or more caches, for example, CPU caches used by the processor(s) 111, page caches used by the operating system 123, disk caches of a hard drive, and/or database caches used to cache content from database 131. For embodiments including a CPU cache, the CPU cache may be used by one or more processors 111 to reduce memory latency and access time. A processor 111 may retrieve data from or write data to the CPU cache rather than reading/writing to memory 121, which may improve the speed of these operations. In some examples, a database cache may be created in which certain data from a database 131 is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of the authentication system 101 are described separately, functionality of the various components may be combined and/or performed by a single component and/or multiple computing devices in communication without departing from the invention.

The user devices (e.g., mobile device 107, computing device 109), the account data server 105, and/or other devices (not shown) may have similar or different architecture as described with respect to authentication system 101. Those of skill in the art will appreciate that the functionality of authentication system 101 (or the mobile device 107, computing device 109, and/or account data server 105) as described herein may be spread across multiple data processing devices, for example, to distribute processing load across multiple computers, to segregate transactions based on geographic location, user access level, quality of service (QoS), etc. For example, the authentication system 101, the account data server 105, the mobile device 107, the computing device 109, and/or other devices (not shown) may operate in concert to provide parallel computing features in support of the operation of authentication software 125 and/or machine learning software 127.

Figures 2, 3:
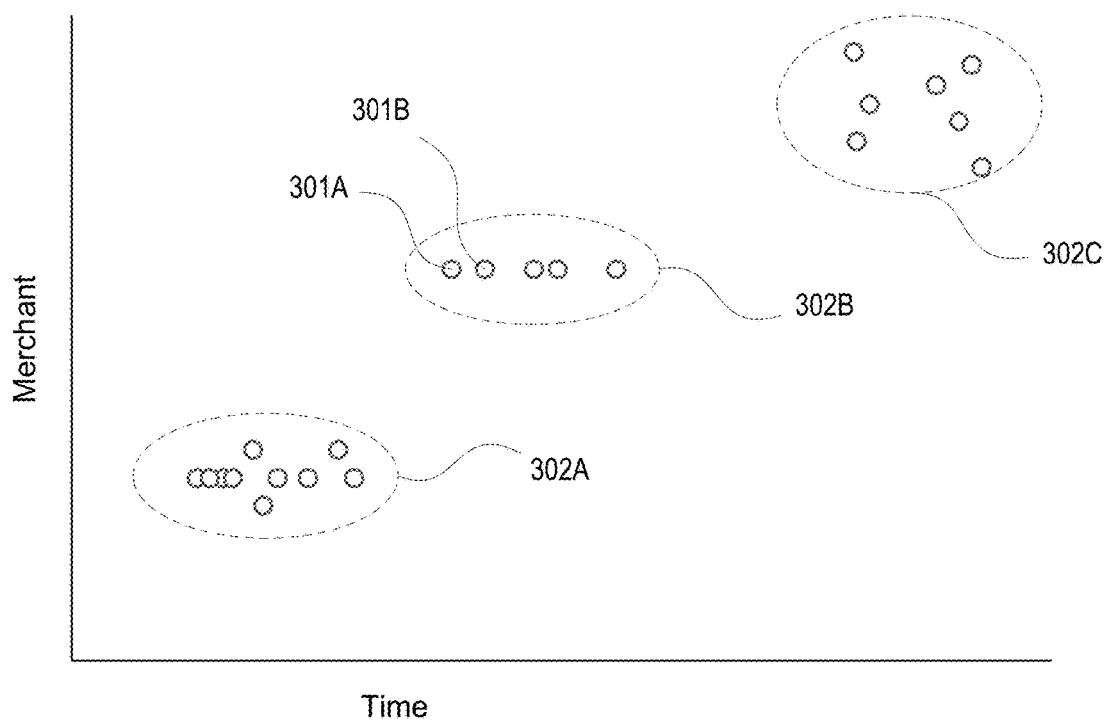
FIG. 2 shows example transaction data which may be analyzed to detect user spending patterns and other patterns as described herein.
FIG. 3 shows and example of clustering user transaction data as described herein.

FIG. 2 illustrates an example of transaction data 200 that may be stored by the account data server 105 and/or the authentication system 101, and that may be used as training data and/or input data for machine learning processes as described below.

The example transaction data 200 includes several example transactions that illustrate principles described below, although a real word data set may be far larger. The transactions may be associated with a particular user account (e.g., a credit card, debit card, or the like) and/or a plurality of accounts (e.g., one particular transaction may have been made via a credit card and another transaction may have been made via a debit card or a different credit card). The authentication system 101 and/or the account data server 105 may maintain a large number of transactions over a long period of time. Thus, although the example transactions include a few transactions over a short period, in practice the authentication system 101 and/or the account data server 105 may store user transaction data for months or years, which may yield a large volume of transactions that may be used to detect persistent spending patterns that take place over long periods and/or patterns that change over time.

The authentication server 101 may analyze the transactions to detect spending patterns, as described in detail below, and ask the user questions that are generated based on the spending patterns in order to authenticate the user. For example, the authentication server 101 may be able to detect and generate spending patterns indicating a merchant the user frequently shops at, a type of merchant the user frequently shops at, an amount (or range of amounts) the user usually spends, a time (or period of time) the user usually shops, and the like. Asking the user questions that are generated based on these spending patterns provides an authentication mechanism that may be easy to use for legitimate users (who are familiar with their own spending patterns) and difficult for malicious users (who may not know the habits and patterns of the user at issue) to compromise.

For example, the authentication server 101 may analyze the example transactions 200 using machine learning techniques as described in detail below and thereby determine that the user regularly transacts with a particular coffee shop in the morning, and usually spends a particular sum. The authentication server 101 may generate a data structure representing this particular spending pattern. For example, the authentication server 101 may use machine learning techniques to generate a vector indicating <9-9:45 AM, weekday, Café Viraj, coffee, $3.15>, which indicates that the user frequently spends $3.15 at a coffee shop called "Café Viraj" on weekdays between 9 AM and 9:45 AM. Similarly, the authentication server 101 may analyze the example transactions using machine learning techniques to generate a spending pattern vector indicating <7:15-8:15 PM, Friday, restaurant, $100+>, which may indicate that the user typically transacts with restaurants on Friday night between 7:15-8:15 and usually spends over $100. As a third example, the authentication server 101 may analyze the transaction data 200 and generate a spending pattern vector indicating <weekend, gym, $1.25>, which may indicate that a user regularly spends $1.25 at a gym on the weekends.

In addition to spending patterns, the authentication server 101 may also detect, from the transaction data 200, "negative patterns" indicating contexts in which the user typically does not perform transactions. For example, the authentication server 101 may use machine learning techniques, as described in detail below, to generate a first vector indicating <9:45 AM-12:15 PM, weekday, none>, and a second vector indicating <1-6 PM, weekday, none>, which may indicate that the user typically does not perform any transactions from 9:45 AM to 12:15 PM and from 1 PM to 6 PM during the week.

Additionally and/or alternatively, the authentication server 101 may use machine learning techniques to detect activities based on the transaction data, as described in detail below. For example, based on the transaction data 200 indicating transactions at the gym on weekends, the authentication server 101 may determine that a user regularly works out on the weekends. Similarly, based on the lack of transactions from 9:45 AM to 12:15 PM and from 1 PM to 6 PM during the week, the authentication server may determine that the user is likely at work between 9:45 AM and 6 PM. The authentication server 101 may also ask the user authentication questions about these activity patterns.

FIG. 3 illustrates an example of clustering transaction data to identify patterns. FIG. 3 presents a simplified example that only uses two dimensions and a few data points 301 (illustrated as circles) in clusters 302 (illustrated as ellipses in dashed lines). On the vertical (y) axis, the data points are arranged according to merchant, with merchants of the same type being adjacent to each other. On the horizontal (x) axis, the data points are arranged according to time of day. Thus, a first cluster 302A may include data points indicating transactions that take place early in the day at different merchants of a particular type (e.g., three different coffee shops). Similarly, a second cluster 302B may include data points indicating transactions that take place around mid-day at a particular merchant (e.g., a particular lunch place). Similarly, a third cluster 302C may include data points indicating transactions that take place in the evening at various merchants of another type (e.g. restaurants). Although this simplified example only shows clusters in two dimensions, in practice, transaction data may have many more dimensions such that spending patterns like the ones described for FIG. 2 may be generated by clustering. Techniques for generating these spending patterns using machine learning processes are described in detail below.

Figure 4:
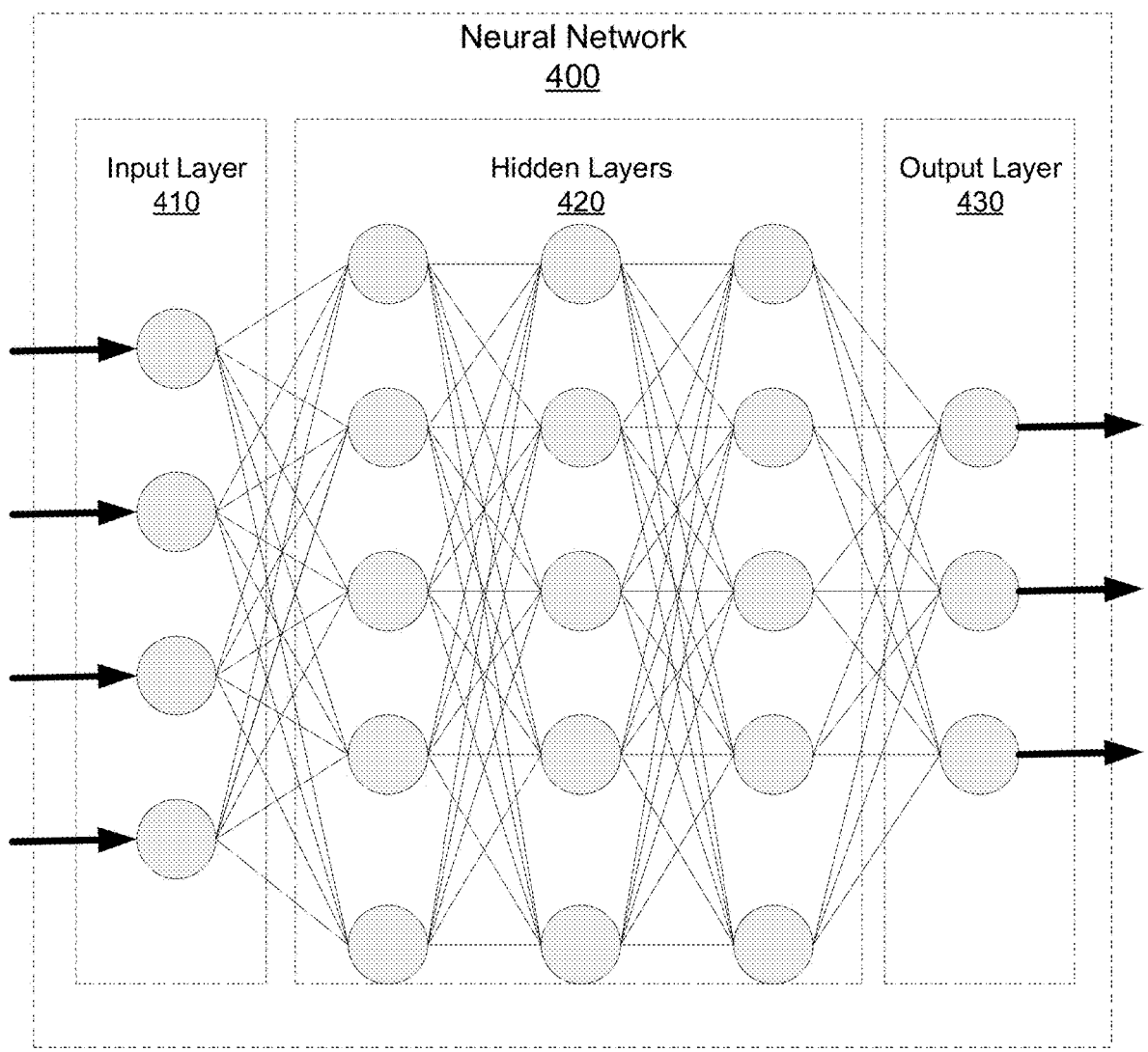
FIG. 4 shows an example neural network architecture 400, which may be used to implement a trained machine learning model for generating spending pattern data as described herein.

FIG. 4 illustrates an example neural network architecture 400, which may be used to implement a trained machine learning model for generating spending pattern data as described herein. An artificial neural network, such as the neural network architecture 400, may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training data set 129 and used to generate predictions regarding the likely results.

An artificial neural network may have an input layer 410, one or more hidden layers 420, and an output layer 430. A neural network may have more than one hidden layer. Illustrated network architecture 400 is depicted with three hidden layers. The number of hidden layers employed in the neural network 400 may vary based on the particular application and/or problem domain. Similarly, the number of input and/or output nodes may vary based on the application. Many types of neural networks are used in practice, such as convolutional neural networks, recurrent neural networks, feed forward neural networks, combinations thereof, and others.

During the machine learning model training process, machine learning software 127 may adjust the weights of each connection and/or node in a learning process as the machine learning model adapts to generate more accurate predictions on a training data set 129. The weights assigned to each connection and/or node may be referred to as the machine learning model parameters. The model may be initialized with a random or white noise set of initial model parameters. The model parameters may then be iteratively adjusted using, for example, stochastic gradient descent algorithms that seek to minimize errors in the machine learning model. As described below with respect to step 505 of FIG. 5, the trained model may be used to implement a model that generates spending patterns based on transaction data.

Figure 5:
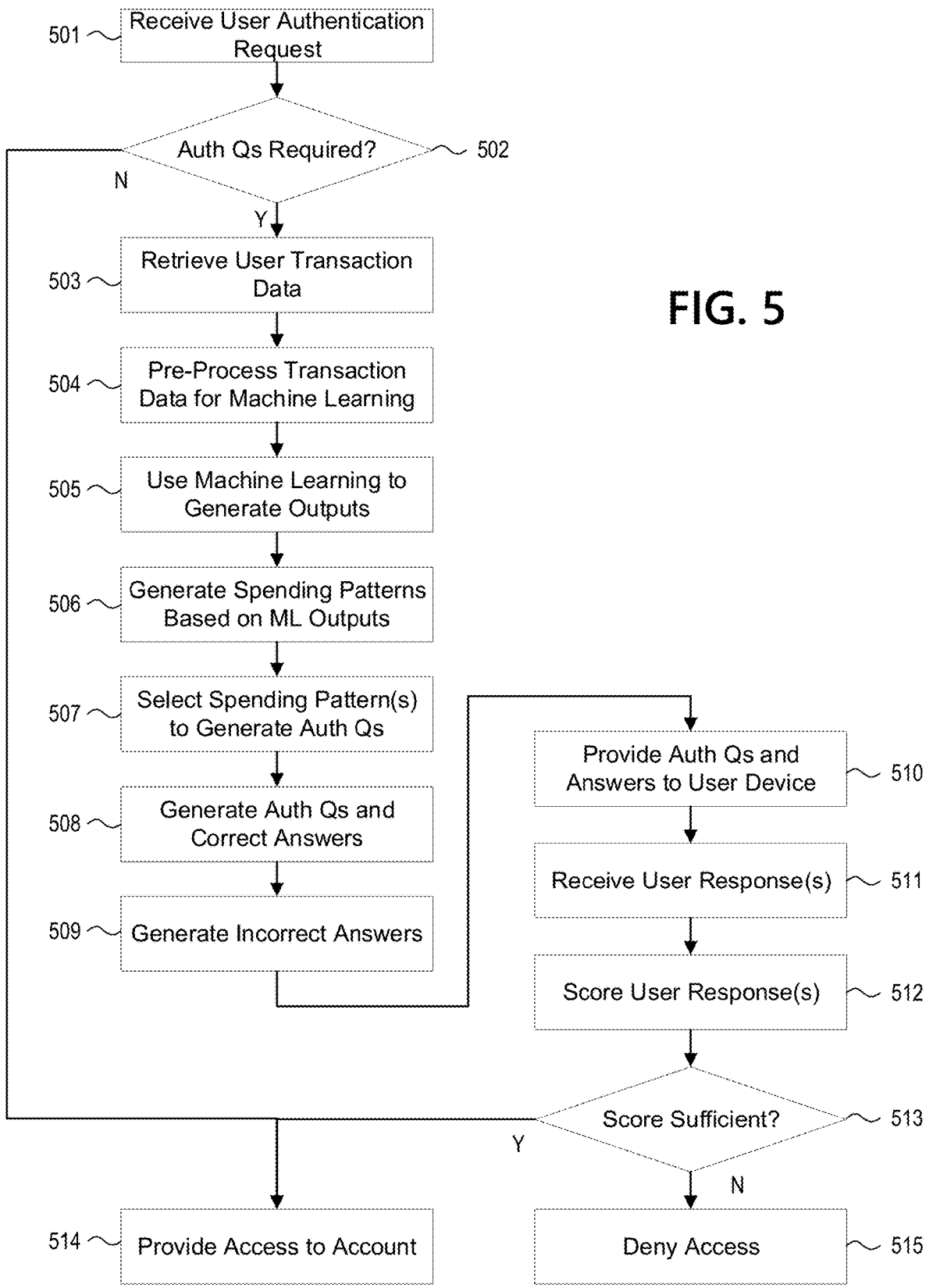
FIG. 5 shows a flow chart of a process for detecting user spending patterns and generating questions to authenticate a user as described herein.

FIG. 5 illustrates a method for authenticating a user based on authentication questions about user spending patterns, which may be generated based on transaction data using machine learning techniques.

At step 501, the authentication server 101 may receive a request to authenticate a user from a user device associated with a user, a device operated by a customer service representative (e.g., a phone operator) who needs to authenticate a user, or some other device. In some cases, the user device may access a website associated with the user account (e.g., a banking website) and attempt to obtain access to the account. Additionally and/or alternatively, the user may call in to a customer service call center, and a customer service agent may use a computing device to submit a request to authenticate the user on behalf of the user. Additionally and/or alternatively, the request to access the account may be part of a request to access and/or change sensitive data associated with an account (e.g., when a user requests financial data associated with an account after logging in, when a user requests to change an address or other contact information, etc.), may be part of a request to perform a transaction or the like.

At decision 502, the authentication server 101 may decide whether the user needs to be authenticated using authentication questions before the authentication server 101 provides access to the account. For example, the authentication server may determine that the user needs to be authenticated if the user is registering for access to a website for the first time, if the user has not logged onto the website from a particular user device before, if the account was recently locked due to a suspicious transaction, if there was a recent fraud report associated with the account, etc. Additionally and/or alternatively, the user may need to be authenticated using authentication questions when the user requests to access or edit certain data associated with an account (e.g., if a user requests access to financial data after logging in to an account, if a user requests to change contact information, etc.), the user may need to be authenticated to perform a transaction for the account, etc. Additionally and/or alternatively, the authentication questions may be used by customer service agents to authenticate the user whenever a user calls into a call center, engages with the customer service representative in a chat session, or the like. If the authentication server 101 decides to authenticate the user using authentication questions, the process may proceed to step 503. If the authentication server 101 decides the user does not need to answer authentication questions (e.g., if the user provided a correct password from a recognized device), the method may proceed to step 514 and provide access to the account.

At step 503, the authentication server 101 may identify the user account associated with the user and retrieve transaction data for the user account. The authentication server 101 may store the transaction data in a database (e.g., internal database 131) and/or may retrieve the transaction data from the account server 105 (e.g., by supplying a user identification number in a lookup request to the account server 105, which may obtain the corresponding transaction data and reply to the authentication server 101).

As shown for the example transaction data 200, the user transaction data may include a plurality of data fields for each transaction, including one or more of a transaction date, transaction day of the week, transaction time, an indicator of whether the transaction was on a weekday or not, a merchant name and/or merchant identifier, a type of merchant, an amount for the transaction, etc. The transaction data 200 may include other fields beyond the data fields shown in FIG. 2; for example, each transaction entry could have a data field indicating a location of the merchant or any other data about the merchant.

At step 504, the authentication server 101 may preprocess the transaction data in order to generate machine learning inputs. Some of the data shown in FIG. 2 could be generated in the preprocessing step. For example, the transaction data could merely store a timestamp (e.g., in UNIX format) for each transaction, and the authentication server 101 at step 504 could then generate, from the timestamp, a data field indicating the day of week, a data field indicating the time of day, a data field indicating whether the transaction was on the weekend or not, or any other time-related data field that could be used as input for the machine learning algorithms.

Additionally and/or alternatively, the authentication server 101 may generate other fields based on known information associated with the transaction. For example, the authentication server 101 may look up a location of each merchant, and generate location data (e.g., GPS coordinates) for a location data field that indicates the location of each merchant. Additionally and/or alternatively, the authentication server 101 may perform a menu lookup to determine what item the user actually or likely purchased based on the transaction amount for each transaction. For example, the authentication server may access a coffee shop's menu to determine that a $3.15 purchase price for a transaction at the coffee shop indicates that a user purchased a cappuccino, and may add an indication of the specific item that was purchased to a field of the transaction data.

The authentication server 101 may also pre-process the transaction data by standardizing, normalizing, or otherwise performing feature scaling on numerical data fields in order to condition the data for the machine learning algorithms. Additionally and/or alternatively, the authentication server 101 may perform one-hot encoding on categorical data fields, or perform other such preprocessing techniques to prepare the transaction data for the machine learning algorithms.

At step 505, the authentication server 101 may use one or more machine learning algorithms on the machine learning inputs to generate machine learning outputs that may indicate spending patterns. The authentication server 101 may use clustering algorithms to generate clusters of transactions, which may then be further analyzed to generate spending patterns at step 506.

The authentication server 101 may use a hierarchical clustering algorithm on the transaction data 200 to generate a hierarchy of transaction clusters that represent different ways of dividing the transactions into clusters. For example, for a user that has a very different transaction pattern during weekdays than on the weekend, the highest level of clustering generated by a hierarchical clustering algorithm may be two clusters-one containing weekday transactions and one containing weekend transactions. Conversely, for a user that follows one schedule on Monday-Wednesday-Friday, a different schedule on Tuesday-Thursday, and a third schedule on the weekend (e.g., a university student), the highest level of classification may divide all of the transactions into three clusters corresponding to the three high-level transaction patterns. Further down the hierarchy (e.g., at a second level, third level, etc.), transactions may be clusters according to more specific patterns, such as one cluster of transactions corresponding to a specific merchant type (e.g., coffee shops) that a user typically transacts at during the week, another cluster of transactions that typically take place on a specific day of the week, or any other pattern that the hierarchical clustering algorithm generates based on the transaction data 200. Thus, the hierarchical clustering algorithm may generate a hierarchical tree specifying different clusters of varying specificity, which may be further analyzed in order to generate a spending pattern (as described at step 506).

Additionally and/or alternatively, the authentication server 101 may use a non-hierarchical clustering algorithm to cluster the transactions of the transaction data 200, such as k-means, k-mode, DBSCAN, a Gaussian mixture model, or any other clustering method. The authentication server 101 may select default parameters, such as a size of a cluster and the minimum number of points to form a cluster for a DBSCAN algorithm, a number k of clusters to form for a k-means or k-mode algorithm, or the like. The authentication server 101 may then execute the clustering algorithm to generate clusters of transactions, as shown using example data in FIG. 3. Each cluster of transactions may be defined by a data structure (e.g., a vector) listing a plurality of transaction identifiers for the transactions assigned to a cluster. In some cases, a single data structure may be used to hold data for each of the clusters (e.g., a vector of vectors). In some cases, the machine learning algorithm may not assign a transaction to any cluster (e.g., because it is an outlier).

Additionally and/or alternatively, the authentication server 101 may use a trained machine learning model, such as a neural network (e.g., according to the neural network architecture of FIG. 4) support-vector machine, naive Bayes classifier, or some other machine learning model generated using supervised learning processes to perform the clustering and/or pattern detection. Trained machine learning models may have the benefit of being able to more accurately generate clusters and/or directly generate labeled spending patterns because the models are trained using detailed training data correlated with labeled outputs. The authentication server 101 may train a model (e.g., a neural network) as shown in FIG. 4 and as described below. The authentication server 101 may execute the training process to train the neural network of FIG. 4 prior to the process of FIG. 5, so that a trained model is pre-prepared for use at step 505. Additionally and/or alternatively, the authentication server 101 may train the model as part of the process of FIG. 5 (e.g., as a substep of step 505) and/or in parallel to the execution of the process of FIG. 5.

The authentication server 101 may provide the inputs generated at step 504 to the trained machine learning model, which may be trained to output clusters of transactions and/or data that describes patterns observed from the transactions. When the machine learning model is trained to output data indicating transaction clusters, it may generate data very similar to the data generated by the clustering algorithms described above. For example, the trained model may generate outputs indicating a list of transactions that are assigned to a first cluster, a list of transactions that are assigned to a second cluster, etc.

Additionally and/or alternatively, the trained machine learning model may directly output one or more data structure(s) indicating patterns derived from the transaction data, such as one or more vectors describing one or more spending patterns. For example, a trained machine learning model, after processing the transaction data 200 as machine learning inputs, may output a vector indicating <9-9:45 AM, weekday, Café Viraj, coffee, $3.15>, which indicates that the user frequently spends $3.15 at a coffee shop called "Café Viraj" on weekdays between 9 AM and 9:45 AM. Similarly, the trained model may output a vector indicating <7:15-8:15 PM, Friday, restaurant, $100+>, which may indicate that the user typically transacts with restaurants on Friday night between 7:15-8:15 and usually spends over $100. Similarly, the trained model may output a vector indicating <weekend, gym, $1.25>, which may indicate that a user regularly spends $1.25 at a gym on the weekend. Such a neural network may have been trained using training data that correlates to transaction data (e.g., data similar to transaction data 200 but for different users) to one or more outputs indicating patterns for the corresponding user. Accordingly, the neural network may have been trained to output one or more data structures indicating one or more spending pattern(s) based on inputs indicating a collection of transaction data.

The trained machine learning model may also output negative pattern data structure(s) describing contexts in which a user did not perform transactions. For example, the trained machine learning model may output a first vector indicating <9:45 AM-12:15 PM, weekday, none>, and a second vector indicating <1-6 PM, weekday, none>, which may indicate that the user typically does not perform any transactions from 9:45 AM to 12:15 PM and from 1 PM to 6 PM during the week. Additionally and/or alternatively, the trained machine learning model may generate data structure(s) indicating activity patterns of the user. For example, the trained machine learning model may generate an output indicating that a user regularly works out on the weekends (e.g., based on transaction data indicating the user is frequently at a gym on weekends). Similarly, the trained machine learning model may generate an output indicating that the user is likely at work between 9:45 AM and 6 PM (e.g., based on a lack of transactions during that time period).

At step 506, the authentication server 101 may generate one or more spending pattern data structure(s) based on the machine learning outputs that were generated at step 505. If the machine learning outputs generated at step 505 include clusters of transactions, the authentication server 101 may automatically analyze the clusters to generate spending pattern data structure(s).

The authentication server 101 may thus analyze a cluster of transactions to determine common characteristics of the cluster, and store such common characteristics in a spending pattern data structure (e.g., a vector). For example, if a cluster of transactions includes a large number of transactions that each have timestamps between 9:05 AM and 9:27 AM, the authentication server 101 may generate a field for a spending pattern data structure (e.g., a vector) that indicates the spending pattern is for 9:05-9:27 AM. In some cases, the authentication server 101 may round time periods in order to standardize the time periods (which may help in generating authentication questions). For example, the beginning time of a time period may be rounded down (e.g., to the nearest half hour) and the ending time of a time period may be rounded up (e.g., to the nearest half hour) so that a time period of 9:05-9:27 AM is rounded to 9-9:30 AM. In some cases, the authentication server 101 may ignore outliers that may be included in a cluster. For example, if a cluster includes twenty transactions with a coffee shop that occur between 9 and 9 AM, and one transaction with the coffee shop that occurs at 4:30 PM, then the one transaction may be ignored for purposes of generating some or all of the spending pattern data fields.

The authentication server 101 may also determine that a cluster is not associated with a particular variable, such as time of day. For example, if the authentication server 101 detects that the transactions of a cluster are randomly scattered throughout the day, then a time period field may not be generated for a spending data structure, and/or a default value (e.g., a null value) may be assigned to a time period field of a spending pattern data structure. The authentication server 101 may detect, for example, that less than a certain percentage (e.g., <70%) of all transactions in a cluster take place in any given time window, and may thus determine that the pattern does not correlate with time of day.

The authentication server 101 may determine that a cluster of transactions commonly take place on certain days or groups of days. For example, some or all transactions of a cluster may take on weekdays, on a Friday, on weekends, on Monday-Wednesday-Friday, etc. If the cluster has such a common characteristic, then the authentication server may generate a data field (e.g., a bit vector with a bit for each day of the week) for a spending pattern data structure. As above, outliers may be ignored, and if a certain threshold of transactions do not fit the pattern (e.g., <70%), then the authentication server 101 may generate a default value (e.g., a null value) for a data field indicating a day of the week for a spending pattern data structure.

Additionally and/or alternatively, the authentication server 101 may determine that a cluster of transactions are commonly associated with a particular merchant and/or merchant type. Some or all transactions of a cluster may be associated with a particular merchant (e.g., a particular coffee shop that a user regularly visits) and/or a particular merchant type. Some clusters may be associated with several merchants of the same type. For example, if the user regularly visits a restaurant on Friday night, but switches between different restaurants, then a cluster of transactions may each be associated with the same merchant type (restaurant) even though they are not associated with the same merchant. Accordingly, the authentication server may generate a data field value indication of a common merchant type and/or a common merchant for a particular spending pattern, and store such as value in a spending pattern data structure. Again, outliers may be ignored, and if a certain threshold of transactions do not fit the pattern (e.g., <70%), then the authentication server 101 may generate a default value (e.g., a null value) for a data field indicating a merchant and/or a merchant type for a spending pattern data structure.

The authentication server 101 may use any common property of a cluster to generate a data field for a spending pattern data structure using the techniques described above. For example, the authentication server may generate field(s) indicating a common amount spent for transactions in a particular cluster, a range of spending amounts for a cluster, a common item purchased for transactions of a cluster, and other such common properties of a cluster.

The authentication server 101 may combine the data fields for various properties associated with a cluster into a data structure defining one or more spending patterns. For example, as described above, a cluster may be associated with common properties for a time period, a particular set of days, a merchant, a merchant type, and a purchase price, and therefore a vector specifying each of these data fields may be generated (e.g., a vector indicating <9-9:45 AM, weekday, Café Viraj, coffee, $3.15>). Other example spending pattern data structures (e.g., vectors) may also be generated with more and/or fewer data fields specified, based on the properties that are common to a particular cluster. In some cases, the authentication server 101 may generate a data structure specifying a plurality of different spending patterns (e.g., a vector of spending pattern vectors) by combining multiple spending pattern data structures into a larger data structure.

When a neural network or other trained machine learning model was used at step 505 to directly generate spending pattern data, then at step 506 the authentication server 101 may only need to perform minimal or no further processing to generate a spending pattern data structure. For example, if a trained machine learning model used at step 505 outputted a vector specifying a spending pattern of <9:05-9:42 AM, weekday, Café Viraj, coffee, $3.15>, then the authentication server 101 may perform some further processing on the vector output, such as rounding the time period to the nearest 15 minutes to yield a vector of <9-9:45 AM, weekday, Café Viraj, coffee, $3.15>, which may be stored as a spending pattern data structure. In other cases, the output of a trained machine leaning model may be used directly as a spending pattern data structure. Thus, the particular machine learning techniques used at step 505 may affect how much and what type of processing needs to be done on the machine learning output(s) at step 506.

The authentication server 101 may further analyze the transaction data 200 and/or the generated spending pattern(s) to determine one or more negative patterns. For example, the authentication server 101 may generate a negative pattern indicating time periods when no transactions typically occur based on the transaction data 200 itself, and/or by analyzing the spending patterns to select time periods that are not specified by any particular spending pattern. In some cases, a separate machine learning model (e.g., a neural network) may be trained to output the negative patterns based on inputs comprising the transaction data 200 and/or the generated spending patterns.

At step 507, the authentication server 101 may select one or more of the spending patterns generated at step 506 to be used to generate one or more authentication questions. The authentication questions may ask users about their patterns of transactions in order to provide questions that are difficult for malicious users to guess.

The authentication server 101 may initially determine how many authentication questions about spending patterns need to be generated in order to authenticate a user. In some cases, the authentication server 101 may only need to generate a small number (e.g., one or two) of authentication questions about spending patterns, and may generate other authentication questions using other strategies. In some cases, the number of authentication questions required may vary based on other contextual information. For example, the authentication server 101 may generate a larger number of authentication questions if there was a recent report of fraud associated with a particular user account.

The authentication server 101 may then determine whether the required number of spending pattern questions can be generated. The authentication server 101 may determine that one or more spending pattern questions can be generated for each spending pattern generated at step 506.

For example, for a spending pattern vector indicating <9-9:45 AM, weekday, Café Viraj, coffee, $3.15>, the authentication server 101 can ask the user what time the user usually buys coffee, what days the user usually buys coffee, what merchant the user usually buys coffee at, what the user usually buys from 9-9:45 AM, how much the user usually spends on coffee at Café Viraj, or any other query based on a combination of two or more data fields indicated by a particular spending pattern. Thus, the authentication server 101 may calculate a number of data field combinations that may be used to generate authentication questions based on the number of spending patterns and the number of common variables specified in each spending pattern.

Certain spending patterns may be excluded from the calculation of how many questions can be generated. For example, the authentication server 101 may maintain a log of previous authentication requests, and which spending patterns and/or data field combinations were used to generate previous authentication questions. The authentication server 101 may then avoid selection of certain spending patterns and/or of certain data field combinations that were previously used, either by excluding the previously-used spending patterns and/or data field combinations from any consideration or by preferring other spending patterns and/or data field combinations if available. The authentication server 101 may maintain such records for a particular period (e.g., the last two weeks) in order to avoid frequent reuse of similar questions on the same spending patterns and/or data field combinations.

In some cases (e.g., for new accounts with only a small number of transactions recorded, for accounts that are shared among different users, and/or for users that have highly variable behavior patterns), the authentication server 101 may determine that no spending patterns were generated and/or that no authentication questions about spending patterns should be generated, and may thus rely on other strategies to generate authentication questions. In such a case, the authentication server 101 may terminate the process of FIG. 5 and use another process to generate authentication questions.

The authentication server 101 may then select one or more spending patterns to generate the necessary number of authentication question(s). The authentication server 101 may simply randomly select patterns that were generated at step 506. For example, if the authentication server 101 needs to generate four authentication questions, it may simply randomly select four spending patterns that were generated at step 506, each of which may be used to generate a single question. Additionally and/or alternatively, the authentication server 101 may select a single spending pattern to generate multiple questions.

Instead of a random selection, the authentication server 101 may prefer certain patterns over others to generate questions, and thus may more preferentially select certain spending patterns. As one example, the authentication server 101 may rank the spending patterns based on the number of transactions that were assigned to a cluster used to generate the particular spending pattern. Users may find more frequent spending patterns (as indicated by the number of transactions) to be more memorable. As another example, the authentication server 101 may rank the spending patterns based on a number of data fields, such that more specific spending patterns are ranked above less specific spending patterns. As a third example, the authentication server 101 may rank the spending patterns based on the length of a time period, with shorter time periods ranked higher. Users may find spending patterns that take place at specific times (e.g., 9-9:30) more memorable than spending patterns that take place over longer time periods (e.g., 6-8 PM). The authentication server 101 may thus preferentially select higher-ranked spending patterns for use in generating authentication questions (e.g., unless they were recently used for a previous authentication attempt, as discussed above).

Additionally and/or alternatively, the authentication server 101 may rank the spending patterns for selection based on an overlap with and/or deviation from a common user spending pattern. For example, if many other users have a pattern of purchasing coffee between 9 AM and 9:30 AM, then the authentication server 101 may reduce the rank of a corresponding spending pattern for the user because it may be easily guessable. However, if a particular user typically buys coffee between 4 PM and 4:30 PM, then the authentication server 101 may determine that this spending pattern has low overlap with other users' spending patterns, and/or has a high deviation from a common user spending pattern, and thus may rank this spending pattern more highly for selection to generate an authentication question. The authentication server 101 may determine an overlap by comparing the user's spending patterns to other spending patterns for other users, and/or to a common spending pattern characterizing the behavior of many other users. It may also determine a deviation by comparing the distance between a user's spending pattern and a common user spending pattern, either in one dimension or in multiple dimensions.

Additionally and/or alternatively, the authentication server 101 may select one or more fake patterns to generate authentication questions. The authentication server 101 may thus ask the user about spending patterns that the user does not have. For example, if a user's transaction history has no coffee shop transactions on the account, the authentication server 101 may ask when the user typically buys coffee, and the correct option may be a default answer such as "none of the above" or the like. Fake spending patterns may be selected in order to trap malicious users attempting to gain unauthorized access to an account. Thus, they may be selected based on common spending patterns that the particular user in question does not have.

In order to select a fake spending pattern to generate an authentication question, the authentication server 101 may compare a common user spending pattern (e.g., a spending pattern characterizing common behavior of other users) to the user's spending patterns and/or transaction history 200. If the common spending pattern does not partially or fully overlap with any user spending patterns or transactions, it may be selected to generate an authentication question. For example, if a common or otherwise average user (e.g., based on one or more average user profiles generated by averaging or otherwise compositing behavior from other users in general, other users with similar characteristics to the particular user being authenticated, etc.) commonly buys lunch between noon and 1 PM, but the particular user for which authentication questions are being generated never, or rarely, conducts lunchtime transactions, then the lunch spending pattern may be used as a fake spending pattern, and questions may be generated about what time the user typically transacts with a lunch shop, where the user typically shops between noon and 1 PM, etc. A user who typically avoids lunch transactions will be able to correctly identify the pattern as fake and select an appropriate answer (e.g., "n/a", "incorrect," "other," or the like).

At step 508, the authentication server 101 may generate the questions and correct answers based on the spending patterns (potentially including negative patterns and/or fake patterns) that were selected at step 507.

The authentication server 101 may generate a question and a corresponding correct answer using data fields specified by a spending pattern. For example, for a spending pattern specifying <7:15-8:15 PM, Friday, restaurant, $100+>, the authentication server 101 may select the first two data fields to generate the question and the third data field to generate the answer (e.g., example question: "what type of transaction do you typically make between 7:15 PM-8:15 PM on Friday?," example answer: "a restaurant transaction"). As another example, the authentication server 101 may select the first two data fields to generate a question, and the last data field to generate the correct answer (e.g., question: "how much do you typically spend on transactions on Friday between 7:15-8:15 PM?," answer: "more than $100").

The authentication server 101 may generate the question and answer using templates that match certain types of data fields. For example, if the data fields for generating a question are "time period" and "day" data fields and the answer is a "merchant type" data fields, then the authentication server 101 may retrieve a matching template for this combination of data field types. The example template may provide a question template (e.g., "What type of transaction do you typically make between [time period] on [day]?"), which can be populated with the data field values taken from the spending pattern data structure. The example template may further provide an answer template for the corresponding data type (e.g., "a [merchant type]transaction"), which can similarly be populated with the data field value.

Thus, to generate a question, the authentication server 101 may first select one or more templates that match a spending pattern data structure, and then populate the template to generate the question and correct answer. For example, the authentication server 101 may select a template for generating a question using first and second data types (e.g., [time period] and [day] values), and generating an answer using a third data type (e.g., a [merchant type] value), because that template matches a particular spending pattern that specifies each of the first, second, and third data types.

The authentication server 101 may randomly select from among the templates that match a particular spending pattern. For example, if four pattern templates match a particular spending pattern, then the authentication server 101 may randomly select one of the four and generate a question using the selected pattern. Additionally and/or alternatively, the authentication server 101 may maintain a ranking of preferred templates, and generally pick the first template from the ranking. However, the authentication server 101 may avoid picking a particular ranked template (e.g., it may skip the first ranked template and use the second ranked template) if the particular ranked template was previously selected (e.g., to generate an authentication question for a recent authentication request, as discussed above) and/or if the same template was used to generate another question.

Additionally and/or alternatively, the authentication server 101 may select a particular template in order to minimize guessability of the correct answer. The authentication server 101 may determine which pattern will yield the least guessable answers based on an overlap with other users' patterns and/or a deviation from a common user pattern that is specific to one or more data fields of the pattern. For example, if a user typically purchases coffee between 8 AM and 8:30 AM (which may be a common pattern for many users), but the user typically spends an unusual amount of money on the coffee purchase (e.g., $20-$25), then the authentication server 101 may select a pattern that uses the unusual spending amount as the correct answer. This may provide a less guessable question than a question about more common data values (e.g., a question about what time the user typically buys coffee, which may be more guessable for a particular user). Thus, the authentication server 101 may select a pattern based on the guessability of the generated question, which may be determined by analyzing the deviation from a common user value and/or the overlap with other users' values of each data field of a particular spending pattern. The authentication server 101 may then select the least guessable data value as the answer, and select a matching pattern based on the selected answer.

Different templates may be used for spending patterns, negative spending patterns, activity patterns, and/or fake spending patterns. For example, for a fake spending pattern, the correct answer may be a default answer such as "incorrect," "other," "none of the above," or the like. For a negative spending pattern, the template may use different language for a template (e.g., "when do you typically avoid making any transactions?") matching particular datatypes. Similarly, the template language may differ for activity patterns.

At step 509, the authentication server 101 may generate one or more incorrect answers that are different from the correct answer. The authentication server 101 may generate incorrect answers that are somewhat similar to the correct answer in order to avoid making a correct answer obvious. Additionally and/or alternatively, the authentication server 101 may generate incorrect answers that are different enough from the correct answers that they do not confuse the user that is associated with the account. The authentication server 101 may thus balance between minimizing guessability for the incorrect answers (e.g., in order to avoid making the question too easy for a malicious attacker) versus minimizing the likelihood of causing confusion (e.g., in order to avoid making the question too hard for a legitimate user). The authentication server 101 may use several techniques to balance these factors, as explained in detail below.

If the answer is a time period (e.g., question: "what time do you typically buy coffee?," answer: "9-9:30 AM") or some other range of values, then the authentication server 101 incorrect answers may be selected so that they do not overlap with the time period and/or range for the correct answer. Additionally and/or alternatively, the authentication server 101 may choose incorrect answers that are popular answers for a particular question in order to minimize guessability. For example, if most users buy a certain item during certain time periods (e.g., if most users buy coffee between 6:30 AM and 9:30 AM), then the incorrect answers may be selected from the common time periods, if they do not overlap with the correct answer (e.g., question: "what time do you typically buy coffee?," correct answer: "9-9:30 AM", incorrect answers: "6-6:30 AM, 7-7:30 AM, 8-8:30 AM"). Additionally and/or alternatively, the authentication server 101 may avoid generating an incorrect answer that is too close to the time period or range of values (e.g., the authentication server 101 may avoid generating an incorrect answer of "8:30-9 AM" because it is too close to the correct answer of "9-9:30 AM").

When a correct answer is a particular merchant, merchant type, or some other categorical value, the authentication server 101 may generate incorrect answers of the same or similar type to the correct answer. For example, if the correct answer is a particular merchant (e.g., a particular coffee shop), the authentication server 101 may generate incorrect answers that indicate different merchants of the same type (e.g., different coffee shops). If the correct answer is a particular merchant type (e.g., question: "what type of merchant do you usually transact with on weekend mornings?," answer: "a gym"), then the incorrect answers may be similar merchant types (e.g., the incorrect answers may indicate a yoga studio, a tennis club, etc.). This approach may be generalized to any categorical data, such as day of week (e.g., incorrect answers may be different days of the week) and the like.

When a correct answer is a particular numeric value, the authentication server 101 may select incorrect answers that are similar to but sufficiently different from the correct value in order to minimize guessability without tricking a legitimate user. For example, the authentication server 101 may select incorrect answers that differ by more than ten percent but less than forty percent from the correct answer. Additionally and/or alternatively, the incorrect answers may be selected such that they are evenly distributed with respect to the correct answer, such that they cluster around a particular most common answer, and/or using any other strategy.

At step 510, the authentication server 101 may provide the generated questions and answers to the user requesting authentication and/or to a customer service representative that is requesting authentication on behalf of the user. The authentication server 101 may provide the authentication questions as part of a webpage to the mobile device 107 and/or other computing device 109. Then, at step 511, the authentication server 101 may receive the user's response(s) to each of the questions as input by the user and/or a customer service representative on behalf of a user.

At step 512, the authentication server 101 may score the user responses. The authentication server 101 may provide a certain number of points for each correct answer to a question (e.g., twenty points for a correct answer), and/or deduct a certain number of points for each incorrect answer to a question (e.g., minus forty points for an incorrect answer), in order to yield an authentication score.

In some cases, the authentication score may also be adjusted based on answers to other authentication questions generating using other strategies. For example, if the authentication server 101 was only able to generate three authentication questions about transaction patterns using the method of FIG. 5 (e.g., because a user account has insufficient transaction data, because a user does not have regular purchasing behavior, because the user's patterns are common and thus easily guessable, or the like), then the authentication server 101 may generate other authentication questions using other strategies in order to provide a sufficient number of questions for the user to score above a certain threshold.

In some cases, the authentication server 101 may weight the scores for correct and/or incorrect answers based on various factors. For example, if a user gets a difficult question right, the score for answering the question correctly may be increased; whereas if a user gets a difficult question wrong, the score for answering the question incorrectly may be reduced, and vice versa for easy questions. The difficulty of a question may be determined based on other user's rates of correct and incorrect answers. For example, if users frequently forget where they shop for gas and therefore tend to incorrectly answer questions about where they purchased gas, then the weighting for an incorrect answer may be reduced by the authentication server 101. The authentication server 101 may assign difficulty ratings to certain merchant types, to certain question patterns, or based on any other question variable. The difficulty ratings may be generated based on historical user data. For example, if 99% of users correctly answer a question created using a first pattern, that pattern may be assigned a relatively low difficulty factor (or conversely, a high easiness factor). However, if <90% of users correctly answer a question created using a second pattern, that pattern may be assigned a relatively higher difficulty factor.

At decision 513, the authentication server 101 may determine whether the score generated at step 512 is sufficient to provide access to the account. For example, the authentication server 101 may provide access to the user if the authentication score is above a certain threshold number (e.g., eighty points).

At step 514, the authentication server 101 may provide access to the account if the user is authenticated. As discussed above, the authentication server 101 may determine to authenticate the user if a total authentication score is above a certain threshold. Additionally and/or alternatively, the authentication server 101 may require the user to correctly answer every question before authentication the user and providing access to the account. At step 515, if the authentication score is insufficient, the user requesting access may be denied.

The authentication server 101 may thus provides access to an account based on patterns derived from the transaction history of the account. By asking question about the spending patterns indicated by account transactions, the authentication server 101 may generate questions that are easier for a legitimate user to correctly answer, but more difficult for a malicious user to correctly answer.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method comprising:
retrieving transaction data for an account associated with a user, wherein the transaction data indicates a plurality of transactions;
determining, based on the plurality of transactions and using a machine learning model, a spending pattern associated with the user;
determining a deviation between:
the spending pattern associated with the user, and
a spending pattern for an average user;
generating, based on the deviation, a question to authenticate the user; and
providing, to a user device and based on a response to the question, access to the account.

2. The method of claim 1, wherein the determining the spending pattern is based on one or more of:
a time of the a transaction;
a location of the transaction;
a day of the transaction;
an amount of the transaction;
a merchant associated with the transaction; or
a type of the merchant associated with the transaction.

3. The method of claim 2, wherein the spending pattern indicates at least one typical user behavior corresponding to at least one of one or more clusters of transactions.

4. The method of claim 1, wherein the spending pattern indicates one or more of:
a time period during which a user typically makes a particular type of transaction;
a particular merchant that a user typically transacts with;
a particular type of merchant that a user typically transacts with;
a time period during which a user typically does not transact with any merchant; or
a time at which a user typically begins or ends an activity.

5. The method of claim 1, wherein the question indicates a merchant or a type of merchant, and wherein the response to the question indicates a first time period during which the user typically transacts with the merchant or the type of merchant.

6. The method of claim 1, wherein the response to the question indicates a merchant.

7. The method of claim 1, wherein the question indicates a time period, and wherein the response to the question indicates a first merchant that the user typically transacts with during the time period.

8. The method of claim 1, wherein the response to the question comprises a selection of one of a plurality of merchants.

9. The method of claim 1, further comprising:
generating, for the user, a fake spending pattern that does not overlap with the spending pattern for the user; and
generating a second question based on the fake spending pattern,
wherein the providing of access to the account is further based on a user response to the second question.

10. The method of claim 1, wherein the deviation of the spending pattern corresponds to a difference in time between a type of purchases made by the user and a corresponding type of purchases made by the average user.

11. A computing device comprising:
one or more processors; and
memory storing instructions that, when executed by the one or more processors, cause the computing device to:
retrieve transaction data for an account associated with a user, wherein the transaction data indicates a plurality of transactions;
determine, based on the plurality of transactions and using a machine learning model, a spending pattern associated with the user;
determine a deviation between:
the spending pattern associated with the user, and
a spending pattern for an average user;
generate, based on the deviation, a question to authenticate the user; and
provide, to a user device and based on a response to the question, access to the account.

12. The computing device of claim 11, wherein the instructions, when executed by the one or more processors, cause the computing device to determine the spending pattern based on one or more of:
a time of a transaction;
a location of the transaction;
a day of the transaction;
an amount of the transaction;
a merchant associated with the transaction; or
a type of the merchant associated with the transaction.

13. The computing device of claim 11, wherein the spending pattern indicates one or more of:
a time period during which a user typically makes a particular type of transaction;
a particular merchant that a user typically transacts with;
a particular type of merchant that a user typically transacts with;
a time period during which a user typically does not transact with any merchant; or
a time at which a user typically begins or ends an activity.

14. The computing device of claim 11, wherein the question indicates a merchant or a type of merchant, and wherein the response to the question indicates a first time period during which the user typically transacts with the merchant or the type of merchant.

15. The computing device of claim 11, wherein the question indicates a time period, and wherein the response to the question indicates a first merchant that the user typically transacts with during the time period.

16. One or more non-transitory computer-readable media storing instructions that, when executed by one or more processors, cause a computing device to:
retrieve transaction data for an account associated with a user, wherein the transaction data indicates a plurality of transactions;
determine, based on the plurality of transactions and using a machine learning model, a spending pattern associated with the user;
determine a deviation between:
the spending pattern associated with the user, and
a spending pattern for an average user;
generate, based on the deviation, a question to authenticate the user; and
provide, to a user device and based on a response to the question, access to the account.

17. The one or more non-transitory computer-readable media of claim 16, wherein the instructions, when executed by the one or more processors, cause the computing device to determine the spending pattern based on one or more of:

a time of the-a transaction;
a location of the transaction;
a day of the transaction;
an amount of the transaction;
a merchant associated with the transaction; or
a type of the merchant associated with the transaction.

18. The one or more non-transitory computer-readable media of claim 16, wherein the spending pattern indicates one or more of:
   a time period during which a user typically makes a particular type of transaction;
   a particular merchant that a user typically transacts with;
   a particular type of merchant that a user typically transacts with;
   a time period during which a user typically does not transact with any merchant; or
   a time at which a user typically begins or ends an activity.

19. The one or more non-transitory computer-readable media of claim 16, wherein the question indicates a merchant or a type of merchant, and wherein the response to the question indicates a first time period during which the user typically transacts with the merchant or the type of merchant.

20. The one or more non-transitory computer-readable media of claim 16, wherein the question indicates a time period, and wherein the response to the question indicates a first merchant that the user typically transacts with during the time period.

* * * * *